US009723451B2

(12) United States Patent
Ljung et al.

(10) Patent No.: US 9,723,451 B2
(45) Date of Patent: Aug. 1, 2017

(54) PROVIDING LOCATION INFORMATION OF A TERMINAL IN A COMMUNICATION NETWORK

(71) Applicant: Sony Mobile Communications, Inc., Tokyo (JP)

(72) Inventors: Rickard Ljung, Helsingborg (SE); Daniel Lönnblad, Genarp (SE)

(73) Assignee: Sony Mobile Communications, Inc., Tokyo (JP)

( * ) Notice: Subject to any disclaimer, the term of this patent is extended or adjusted under 35 U.S.C. 154(b) by 0 days.

(21) Appl. No.: 15/043,001

(22) Filed: Feb. 12, 2016

(65) Prior Publication Data
US 2017/0142555 A1    May 18, 2017

Related U.S. Application Data

(63) Continuation of application No. PCT/EP2015/076803, filed on Nov. 17, 2015.

(51) Int. Cl.
*H04W 24/00* (2009.01)
*H04W 4/02* (2009.01)

(52) U.S. Cl.
CPC ........... *H04W 4/028* (2013.01); *H04W 4/026* (2013.01); *H04W 4/027* (2013.01)

(58) Field of Classification Search
CPC ..... H04W 4/028; H04W 4/026; H04W 4/027; H04W 60/00; H04W 4/02; H04W 4/20; H04W 4/021; H04W 5/006; G06Q 10/10; G06Q 50/18; H04M 15/68; H04M 15/8033

USPC ...................................... 455/456.6
See application file for complete search history.

(56) References Cited

U.S. PATENT DOCUMENTS

| 7,664,527 B2* | 2/2010 | Bari ............... H04W 12/06 455/550.1 |
| 8,064,379 B2* | 11/2011 | Huang ............ H04W 4/02 348/14.02 |
| 8,135,635 B2* | 3/2012 | Molotsi ........... G06Q 10/04 705/30 |
| 9,294,899 B2* | 3/2016 | Lee .............. H04W 4/001 |
| 9,549,386 B2* | 1/2017 | Venkatraman ..... H04W 64/00 |

(Continued)

OTHER PUBLICATIONS

[No Author Listed] 3$^{rd}$ Generation Partnership Project; Technical Specification Group Radio Access Network; Evolved Universal Terrestrial Radio Access (E-UTRA; LTE Positioning Protocol (LPP) Release 12. 3GPP TS 36.355 v12.4.0. Mar. 2015. 126 pages.

*Primary Examiner* — Mahendra Patel
(74) *Attorney, Agent, or Firm* — Wolf, Greenfield & Sacks, P.C.

(57) ABSTRACT

The present application relates to a method for providing location information of a terminal (30) and in a communication network (10). According to the method, a location information indicating a location of the terminal (30) in the communication network (10) is determined by the terminal (30). Furthermore, a time information indicating a time at which the terminal (30) is located at the location indicated by the location information is determined by the terminal (30). The location information and time information is transmitted by the terminal (30) to a base station (20) or to another terminal (30) of the communication network (10).

21 Claims, 1 Drawing Sheet

(56) References Cited

U.S. PATENT DOCUMENTS

| | | | |
|---|---|---|---|
| 2004/0203870 A1* | 10/2004 | Aljadeff | H04W 64/00 455/456.1 |
| 2010/0145784 A1* | 6/2010 | Sriver | G01C 21/20 705/14.25 |
| 2012/0064891 A1* | 3/2012 | Wijayanathan | H04W 4/021 455/435.1 |
| 2013/0055348 A1* | 2/2013 | Strauss | G06F 21/31 726/3 |
| 2013/0262354 A1* | 10/2013 | Ide | G06N 99/005 706/12 |
| 2014/0018110 A1* | 1/2014 | Yoakum | H04W 4/02 455/456.5 |
| 2014/0135017 A1* | 5/2014 | Hirano | H04W 36/0061 455/437 |
| 2015/0358796 A1* | 12/2015 | Sarna, II | H04W 4/22 455/404.2 |
| 2016/0286501 A1* | 9/2016 | Taite | H04W 52/245 |

* cited by examiner

# PROVIDING LOCATION INFORMATION OF A TERMINAL IN A COMMUNICATION NETWORK

CROSS-REFERENCE TO RELATED APPLICATIONS

This application is a Continuation Application of International Application No. PCT/EP2015/076803, filed Nov. 17, 2015. This application is hereby incorporated herein by reference in its entirety.

FIELD OF THE INVENTION

The present invention relates to cellular communication systems, in particular to methods and devices for providing location information of terminals in the communication network.

BACKGROUND OF THE INVENTION

The use of wireless communication systems and applications using mobile data communication continues to grow. Some applications may consider and take advantage of positioning information of a mobile device, for example social network applications, weather and traffic service applications, vehicle to vehicle communications, flying drone communications, machine to machine communications, and so on.

In wireless communication systems corresponding positioning protocols are implemented or standardised. For example, in 3GPP the LTE positioning protocol (LPP) is defined and specifies the communication protocol for communicating positioning data between user equipment (UE) and the communication network. Details on the specification are defined in TS 36.355. According to the LPP, the network, for example a base station (also known as eNodeB) or a relay node, may request an UE (also known as mobile device or terminal) to report its position and it may assist with network information to support the positioning method used by the UE. When the UE has positioning data to deliver, LPP also describes the protocol for transferring this information.

Furthermore, the network may request the UE to report its positioning capabilities (described in TS 36.355 section 5.1.1 "Capability Transfer Procedure"). In response the UE may indicate which positioning methods the UE is capable of. After this procedure the network may request the UE for positioning information. This is described in TS 36.355 section 5.3.2 "Location Information Delivery Procedure". The request may include a specific positioning method to be used and may include a transaction ID to tag each request with an identification code.

However, in data communications in connection with rapidly moving communication partners, for example in vehicle to vehicle communications or flying drone communications, present LPP may not be sufficient or may induce a large communication amount for positioning data.

Moreover, further applications using wireless communications may require increasing amounts of data and increasing data rates, for example mobile video streaming. However, transmission capabilities in the network may vary significantly when a UE is moving from one location to another location. This may interrupt or a significantly degrade playback of streamed media data.

SUMMARY OF THE INVENTION

In view of the above, there is a need in the art for methods and devices which address at least some of the above shortcomings of conventional wireless communication systems. There is in particular a need in the art for enhancing positioning capabilities and positioning information to avoid the above-described problems.

According to the present invention, this object is achieved by the features of the independent claims. The dependent claims define embodiments of the invention.

According to the present invention, a method for providing location information of a terminal in the communication network is provided. According to the method, a location information indicating a location of the terminal in the communication network is determined by the terminal. The terminal may comprise for example a mobile user equipment like a mobile phone. Furthermore, a time information indicating a time at which the terminal is located at the location indicated by the location information is determined by the terminal. The location information and the time information are transmitted by the terminal to the network, for example to a base station or another terminal of the communication network.

By determining the time information which indicates the time at which the terminal is located at the location indicated by the location information, and transmitting this time information together with the location information to for example a base station, the base station obtains a more precise real-time location information of the terminal which may be advantageously used in scenarios relying on position information, for example a vehicle to vehicle communication, flying drone communication or data streaming. For example, a location-dependent coding and quality of video streaming data may be selected accordingly. In particular, if the docks of the base station and the terminals in the communication network are synchronised, the base station may obtain a precise location information of the terminal irrespective of processing and transmission delays. For example, the time information may be transmitted from the terminal in an extended LTE positioning protocol (LPP).

According to an embodiment, the location is a future location of the terminal and the time is a future time at which the terminal will presumably be located at the future location. In other words, the terminal predicts its future position and communicates this information to the base station. The terminal may predict its future position based on sensors of the terminal, for example sensors for determining a global positioning of the terminal via for example a satellite-based positioning system (GPS) or sensors for determining a movement of the terminal, for example a speed sensor, an acceleration sensor and/or a compass. For example, in a device to device scenario, in particular in vehicle to vehicle communications, the terminal may predict where the vehicle will be in a few seconds or minutes to support traffic management. In a load balancing scenario, the prediction time may be in the range of several minutes and this information may be used for example to decide when to send streaming data for avoiding heavily the loaded cells. For example, when the terminal is moving in a subway, within a subway station a large bandwidth may be available whereas between the subway stations in a tunnel the bandwidth may be poor. By predicting when the terminal will be at the subway stations, streaming data of for example a video streaming may be transmitted beforehand while the terminal is staying at the subway station such that sufficient video data may be buffered to provide a continuous video streaming while the terminal is moving in the tunnel to the next subway station.

In another embodiment, transmitting the location information and the time information comprises additionally a transmission of a confidence level information indicating a level of confidence of a prediction that the terminal will be located at the future location at the future time. The confidence level information may comprise for example a relative level of confidence, for example a percentage value indicating a probability that the terminal will be located at the predicted future location at the predicted future time. The confidence level information may depend on historical movement information collected by the terminal, an environment in which the terminal is used, or additional travelling information of the terminal. For example, when the terminal is used in a car driving along a highway, a speed and direction will not vary significantly such that a high level of confidence may be assigned to a predicted position of the terminal within the next few seconds or minutes. However, when the terminal is used in a car within a city, the speed and direction may vary significantly and therefore a high level of confidence may be assigned to a predicted position of the terminal only within a few seconds, or a low level of confidence may be assigned to a predicted position for a time period of some minutes. However, when a travelling route has been planned to a destination and the car is following this travelling route, a high level of confidence may be assigned even in urban environments. In another example the terminal may be used in a train or subway. In case a schedule of the train or subway is available, a high level of confidence may be assigned to future positions of the terminal even for longer future periods of time, for example some minutes or even an hour.

According to a further embodiment, the time information comprises a period of time at which the terminal is located at the location indicated by the location information. For example, when the terminal is moving it may predict a location which will be reached in the future. However, depending on a varying speed of the terminal due to for example traffic conditions or a delay in a public means of transportation, the point in time when the terminal will reach the location may vary. However, by indicating a period of time the terminal may indicate that the indicated location will be reached within this time window. When streaming media data to a terminal, a base station may consider this information for providing sufficient amount of media data to the terminal in advance or may plan a burst transmission of media data at the predicted location.

The location information may comprise for example a predicted future geographical location and a predicted future geographical location deviation. The geographical location may comprise for example a longitude and latitude information. The deviation may comprise for example a radius around the predicted future geographical location. Additionally or as an alternative, the deviation may be described as an ellipse indicating an area around the predicted future geographical location. Thus, the future geographical location and the future geographical location deviation indicate an area in which the terminal will presumably be arranged at the future time.

Additionally, the location information may also include elevation information to get three dimensional location information. This may be useful for flying object positioning, and for locations in buildings, for example for determining a floor level.

Additionally or as an alternative, the location information may comprise at least one of a current geographical location, a current speed information and a current direction of movement information. Thus, the base station may predict the future geographical location based on the location information.

According to another embodiment of the method, a capability information which indicates a capability of the terminal to predict a future location of the terminal is determined by the terminal and transmitted from the terminal to the base station or the other terminal of the communication network. For example, the terminal may provide in the capability information an indicator flag which indicates that the terminal is capable of providing a timestamp relating to the location information. Furthermore, the terminal may indicate by the capability information that it can provide a future location report and that the terminal can indicate that such reporting can be provided with a certain confidence level or that the timing in advance is within a certain range. Therefore, in the network, for example a base station may plan for each terminal individually data communication characteristics. For example, the capability information may be transmitted via an extended LTE positioning protocol within a capability transfer procedure.

According to a further embodiment, a location request comprising a received time information is received at the terminal. The received time information indicates a future point in time or a future time period. When determining the location information, the terminal determines a location information which indicates the location of the terminal at the received time information. In other words, the terminal receives a request to provide a location prediction for a specific future point in time or future time period from the network, for example from a base station, another terminal or an application running in the network. In response to the request, the terminal predicts its location at the future point in time or the future time period and transmits this location information to the requestor. Therefore, in the network, for example a base station or an application may plan data communication characteristics for certain future points in time or future time periods.

According to another embodiment of the method, a location request is received at the terminal. The location request comprises a received confidence level. The received confidence level indicates a desired level of confidence of the location information transmitted by the terminal. For determining the location information and time information, the terminal determines a location information and a corresponding time information such that the location information and the time information indicate the location of the terminal at the time indicated by the corresponding time information with the desired level of confidence. Therefore, in this embodiment, for example a base station may request the terminal to provide a future location information with a certain level of confidence. For example, a location information with the high level of confidence may be requested in a vehicle to vehicle or a vehicle to infrastructure scenario for automatic driving features of the vehicles, whereas a location information with the low level of confidence may be requested in a vehicle to infrastructure scenario for predicting traffic density and congestions. The confidence level may comprise for example a relative value, for example a percentage value or one of a predefined set of categories comprising for example the values low, medium and high.

According to an embodiment, the terminal determines at least one of a current location information of the terminal, a current speed information of the terminal, a current direction information of the terminal, and a current environmental information of the terminal. Furthermore, the terminal determines the location information based on at least one of the current location information, the current speed information, the current direction information, and the current environmental information. For example, based on the current location information, the speed information and the direction information, the terminal may predict its future location assuming that the current speed and direction may be maintained for at least a prediction period. The environmental information may comprise for example that the terminal is moving along with a train, subway, car or ship. Additional information like a timetable of the train, subway or ship, or a planned route of a navigation system of the car may be utilised to predict the future location of the terminal.

Furthermore, according to the present invention, a terminal for a communication network is provided. The terminal comprises a positioning unit configured to determine a location information indicating a location of the terminal in the communication network, and a processing unit configured to determine a time information indicating a time at which the terminal is located at the location indicated by the location information. The terminal comprises furthermore a transceiver unit configured to transmit the location information and the time information to a base station or another terminal of the communication network.

The terminal may comprise for example a mobile telephone, a tablet computer, a mobile computer, a smart mobile accessory, a smart wearable device, a vehicle to vehicle communication device or a vehicle to infrastructure communication device. A smart mobile accessory or a smart wearable device may comprise a wearable computer, also known as body-borne computer or simply wearable, which is a miniature electronic device that may be worn by a user under, with or on top of clothing. Furthermore, the terminal may be configured to perform the above described method and the embodiments thereof. Therefore, the terminal also comprises the above described advantages.

Furthermore, according to the present invention, a method for operating a node of a communication network is provided. According to the method, a location information and a time information from a terminal of the communication network received at the node. The location information indicates a location of the terminal in the communication network and the time information indicates a time at which the terminal is located at the location indicated by the location information. The node may comprise for example a base station, another terminal acting as a user equipment or another terminal acting as relay node in the communication network.

The location may be a future location of the terminal and the time may be a future time at which the terminal will presumably be located at the future location. According to the method, a data communication between the node and the terminal is configured depending on the location information and the time information received from the terminal. For example, by considering the location information of the terminal in the future, a load balancing between cells of the communication network may be optimised, or a required average data transmission rate for video streaming may be accomplished by transmitting large amounts of data in advance at a location with high data transmission capabilities before the terminal is moving to a location with poor data transmission capabilities.

According to an embodiment, receiving the location information and the time information comprises additionally a reception of a confidence level information indicating a level of confidence of a prediction of the terminal, i.e. that the terminal will be located at the future location at the future time. The confidence level information may comprise for example a relative level of confidence, for example a category value like low, medium or high or a percentage value indicating a probability that the terminal will be located at the predicted future location at the predicted future time.

According to a further embodiment the time information comprises a period of time at which the terminal is located at the location indicated by the location information. For example, when a terminal is moving it may predict a location which will be reached in the future. However, depending on a varying speed of the terminal due to for example traffic conditions or a delay in a public means of transportation, the point in time when the terminal will reach the location may vary. Therefore, by indicating a period of time the terminal indicates that the indicated location will be reached within this time window. For example, when media data is streamed to the terminal, the base station may consider this information for providing sufficient amount of media data to the terminal in advance or may plan a burst transmission of media data at a certain predicted location.

The location information may comprise for example a predicted future geographical location and a predicted future geographical location deviation. The geographical location may comprise for example a longitude and latitude information. The deviation may comprise for example a radius around the predicted future geographical location. Additionally or as an alternative, the deviation may be described as an ellipse indicating an area around the predicted future geographical location. Thus, the future geographical location and the future geographical location deviation indicate an area in which the terminal will presumably be arranged at the future time. Furthermore, the location information may also include elevation information to get three dimensional location information.

Additionally or as an alternative, the location information may comprise at least one of a current geographical location, a current speed information and a current direction of movement information. Thus, the base station may predict the future geographical location based on the location information.

According to another embodiment of the method, a request to transmit a capability information is transmitted from the node to the terminal. The capability information indicates a capability of the terminal to predict and provide a future location of the terminal. The capability information may be determined by the terminal and may be transmitted from the terminal to the node in response to the request.

For example, the terminal may provide in the capability information an indicator flag which indicates that the terminal is capable of providing a timestamp relating to the location information. Furthermore, the terminal may indicate by the capability information that the terminal is capable of providing a future location report, the terminal is capable of providing a future location report with a certain confidence level or the terminal is capable of providing a future location report with a timing information within a requested range. Therefore, the node may plan for the terminal individual data communication characteristics. For example, the capability information may be transmitted via an extended LTE positioning protocol within a capability transfer procedure.

According to a further embodiment, the node transmits a location request comprising a time information to the terminal. The time information indicates a future point in time or a future time period. In response, the node wants to receive a location information from the terminal, which indicates a location of the terminal at the time information. The terminal may receive the request and may predict its location at the future point in time or the future time period and may transmit this location information to the node. Therefore, in the network, for example a base station or an application may plan data communication characteristics for certain future points in time or future time periods.

According to another embodiment of the method, the node transmits a location request to the terminal which comprises a confidence level. The confidence level indicates a desired level of confidence of the location information transmitted by the terminal. For determining the location information and time information, the terminal may determine a location information and a corresponding time information such that the location information and the time information indicate the location of the terminal at the time indicated by the corresponding time information with the desired level of confidence. In other words, in this embodiment, the node requests the terminal to provide a future location information with a certain level of confidence. For example, a location information with a high level of confidence may be requested in a vehicle to vehicle scenario or in a vehicle to infrastructure scenario for automatic driving features of the vehicles, whereas a location information with a low level of confidence may be requested in a vehicle to infrastructure scenario for predicting traffic density and congestions.

Finally, according to the present invention, a node for a communication network is provided. The node comprises a transceiver unit which is configured to receive a location information and a time information from a terminal of the communication network. The location information indicates a location of the terminal in the communication network and the time information indicates a time at which the terminal is located at the location indicated by the location information. The node comprises furthermore a processing unit which is configured to configure a data communication between the node and the terminal depending on the location information and the time information received from the terminal. The node may comprise for example a base station of wireless cellular communication network, a relay node of the communication network or another terminal of the communication network, for example a user equipment.

Furthermore, the node may be configured to perform the above described method and the embodiments thereof. Therefore, the node also comprises the above described advantages.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
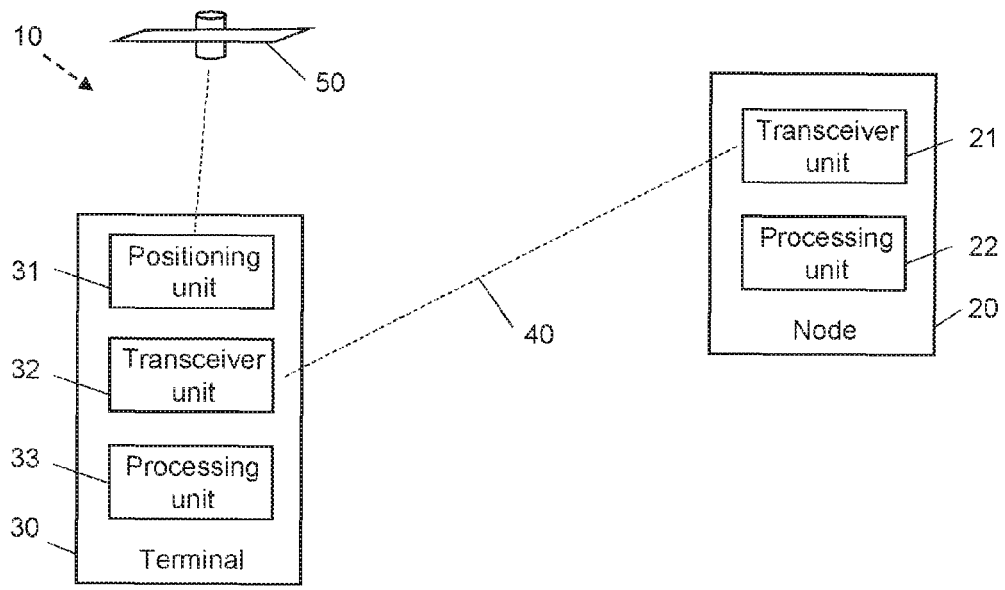
FIG. 1 shows schematically a terminal and a node according to embodiments of the present invention.

FIG. 1 shows a communication system 10 according to an embodiment. The communication system 10 includes a node 20 and a terminal 30. The communication network 10 may be a wireless cellular communication network operating according to international standards, for example according to LTE standards defined in 3GPP. The node 20 may act as a base station in the communication system 10. In LTE systems a base station is also called eNodeB. However, the node 20 may be any other kind of equipment in the wireless communication network 10 with which the terminal 30 may communicate or at which the terminal 30 may register. For example, in a device to device communication, the node 20 may comprise another terminal, with which a data communication is to be set up or which is acting as a relay node. In LTE systems the terminal 30 is also called user equipment UE. The terminal 30 may comprise for example a mobile phone, in particular a smart phone, a mobile computer, a tablet computer, a smart mobile accessory, a smart wearable device, or a device for a vehicle to vehicle communication or for a vehicle to infrastructure communication.

Although FIG. 1 shows only one base station 20 and one terminal 30, the communication network 10 may comprise any number of base stations or terminals.

The node 20 comprises a transceiver unit 21 and a processing unit 22. The transceiver unit 21 is configured to set up a wireless communication 40 to the terminal 30. The processing unit 22 is configured to process data received from the terminal 30 and to manage a data communication between the node 20 and the terminal 30.

The terminal 30 comprises a positioning unit 31, a transceiver unit 32 and a processing unit 33. The positioning unit 31 is configured to determine a location information indicating a location of the terminal 30 in the communication network 10. The positioning unit 31 may comprise for example a receiver for receiving positioning information from a satellite-based global positioning system 50 like GPS. Additionally, or as an alternative, the positioning unit 31 may comprise further sensors for determining a position of the terminal 30, for example an acceleration sensor, a speed sensor, a compass and so on. The transceiver unit 32 is configured to receive and transmit information from and to the node 20. The processing unit 33 is coupled to the positioning unit 31 and the transceiver unit 32 and configured to process information from the positioning unit 31 and the transceiver unit 32 and to output processed information via the transceiver unit 32.

The operation of the node 20 and the terminal 30 will be described in connection with FIG. 2 in more detail.

In wireless communication systems, a lot of applications require or utilise positioning information of a terminal or user equipment. Typical usage of positioning information is for example supporting vehicle to vehicle communications, flying drone communications and machine to machine communications. In present wireless cellular communication systems positioning protocols are implemented. For example, 3GPP defines the LTE positioning protocol (LPP) which specifies the communication protocol for communicating positioning data between a terminal or user equipment (UE) and the network. Within LPP the network may request the UE to report its position and it can assist with network information to support the positioning algorithms used by the UE. When the UE has positioning data to deliver, LPP also describes the protocol for transferring this information.

For providing enhanced positioning information, according to an embodiment, a time indicator is added to the location reporting from the user equipment or terminal. This time indicator enables the possibility to indicate more precisely a current, expected, predicted or known future location. In addition, the capability of the terminal 30 for providing such enhanced positioning information may be requested by corresponding protocol elements communicated between the terminal 30 and the node 20.

Figure 2:
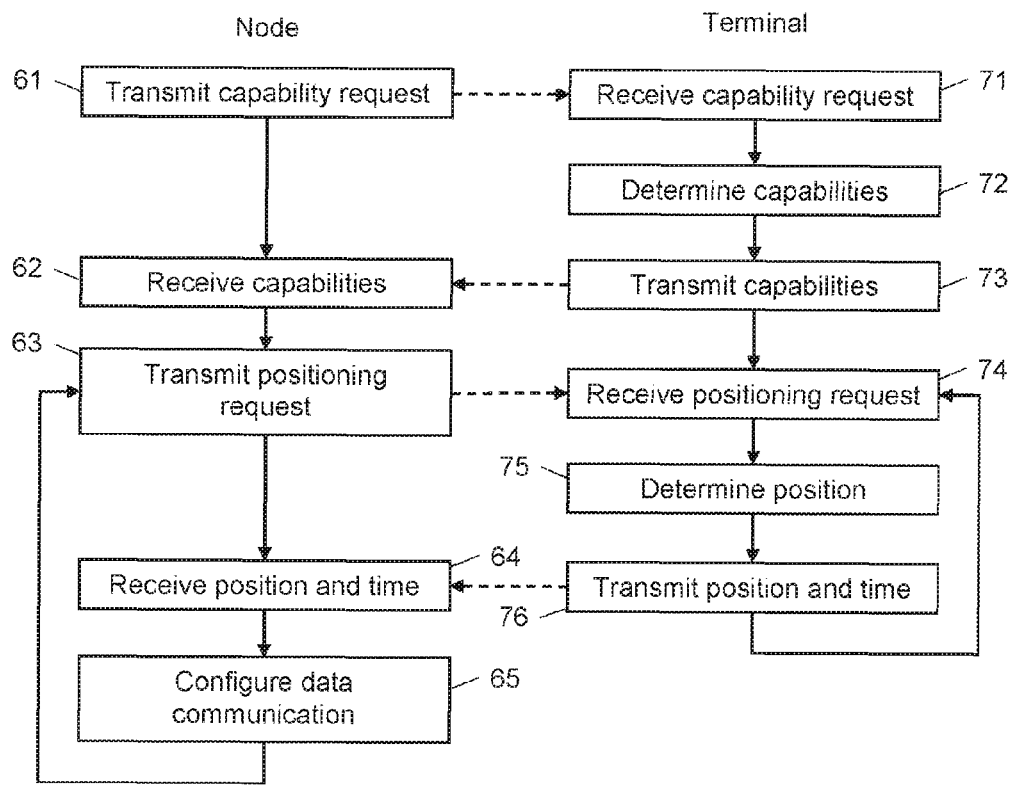
FIG. 2 shows a flow chart comprising method steps for providing location information of a terminal in a communication network according to embodiments of the present invention.

In detail, FIG. 2 shows method steps 61 to 65 which are performed by the node 20 and method steps 71 to 76 performed by the terminal 30.

In step 61 a capability request is transmitted from the node 20 to the terminal 30. In step 71 the terminal 30 receives the capability request and determines its own positioning capabilities (step 72). For example, when the terminal 30 is travelling along with a train, future positioning information may be provided with high accuracy with respect to position and time by considering timetable information of the train. In another example, when the terminal 30 is travelling along with a car, positioning information may be provided with high accuracy with respect to the position based on a planned route for the car from a navigation system of the car. However, the exact timing when the terminal will be at a certain location may have low accuracy as this may depend on current traffic conditions, weather conditions and the driving characteristics of the driver.

The capability may additionally or as an alternative comprise general information, for example if the terminal 30 is capable at all to predict a future position or if it supports certain features of the future position determination, for example to determine a confidence of the future position information or if the terminal 30 is capable of providing a position information having a requested confidence level. In step 73 the terminal 30 transmits the determined positioning capabilities to the node 20. In step 62 the node 20 receives the positioning capabilities from the terminal 30.

In step 63 the node 20 transmits a positioning request to the terminal 30. The positioning request may comprise additional parameters to be considered by the terminal 30 for determining the positioning information. For example, the positioning request may include a future point in time or a future time period for which the positioning information of the terminal 30 is requested. Additionally or as an alternative, the additional parameters may define a level of confidence the positioning information shall provide. When a high level of confidence is requested, the point in time for the prediction may be selected by the terminal in the near future, for example within the next seconds or the position information may comprise a large area indicated by for example a centre and a deviation radius in which the terminal will be located at the point in time in further future with the required level of confidence.

In step 74 the positioning request is received by the terminal 30 and in step 75 the terminal determines its position with respect to the parameters which came along with the positioning request. The terminal 30 may determine for example a current geographical location, a current speed information and a current direction of movement information. Based on this information the terminal 30 may predict a future geographical location and a predicted future geographical location deviation. The terminal 30 may furthermore determine a current environmental information of the terminal 30, for example if the terminal 30 is located within a vehicle, like a train, a car or a ship, or if the terminal is located in an urban or rural environment. This information may additionally be considered by the terminal 30 to predict its future geographical location. The terminal may additionally determine a level of confidence for the determined positioning information and time information. The level of confidence may comprise for example a relative value, for example a value in the range of 0 to 100 percent, or the confidence level may comprise a category of a predefined set of categories comprising for example the categories low, medium and high. In step 76 the terminal 30 transmits the position information and the time information and optionally the confidence information to the node 20. The node 20 receives the positioning information and time information as well as the confidence information in step 64.

In step 65 the node 20 may use the received positioning information to configure a data communication between the node 20 and the terminal 30. For example, when the terminal is receiving streaming data, for example video streaming data, the node 20 may plan media downloads to the terminal 30 based on the received positioning and time information. For example, when the terminal 30 is presumably moving along areas where different data transmission bandwidth are available, the node 20 may transmit a large amount of data in advance to the terminal 30 such that when the terminal 30 is arranged in an area with low transmission bandwidth, sufficient amount of video data is already buffered in the terminal 30 to bridge the area with the low transmission bandwidth.

Additionally or as an alternative, the node 20 may forward the positioning and time information to applications running on the node 20 or to applications running on a server or another terminal which utilise this positioning and time information. For example, in a vehicle to vehicle communication the predicted positioning and time information may be used to avoid vehicle collisions and may increase traffic throughput. Furthermore, based on the predicted positioning information, a load balancing in a cellular communication network may be accomplished for example to avoid heavily loaded cells when streaming large amounts of data, for example when streaming media data.

Finally, it should be noticed that the above description provides details and explanations of how the invention may be implemented specifically into 3GPP LPP protocol. However, the principles disclosed in this description may also be implemented in other protocols, e.g. in protocols of "5G standards" and other future protocols and radio access technologies, still with the concept of providing time based positioning information, but with different naming of network nodes, protocol versions, message identities etc.

The invention claimed is:

1. A method for providing location information of a terminal in a communication network, the method comprising:
   determining, by the terminal, a location information indicating a location of the terminal in the communication network,
   determining, by the terminal, a time information indicating a time at which the terminal is located at the location indicated by the location information,
   transmitting, by the terminal, the location information and the time information to a base station or another terminal of the communication network, and
   communicating data of a data communication between the terminal and the base station or the other terminal of the communication network, the data communication being configured at the base station or the other terminal depending on the location information and the time information received from the terminal.

2. The method according to claim 1, wherein the location is a future location of the terminal and the time is a future time at which the terminal will presumably be located at the future location.

3. The method according to claim 2, wherein transmitting the location information and the time information comprises transmitting a confidence level information indicating a level of confidence of a prediction that the terminal will be located at the future location at the future time.

4. The method according to claim 1, wherein the time information comprises a period of time at which the terminal is located at the location indicated by the location information.

5. The method according to claim 1, wherein the location information comprises at least one of:
   a predicted future geographical location and a predicted future geographical location deviation,
   a current geographical location,
   a current speed information, and
   a current direction of movement information.

6. The method according to claim 1, further comprising:
   determining a capability information indicating a capability of the terminal to predict a future location of the terminal, and
   transmitting, by the terminal, the capability information to the base station or the other terminal of the communication network.

7. The method according to claim 1, further comprising:
   receiving, at the terminal, a location request comprising a received time information, the received time information indicating a future point in time or a future time period, wherein determining the location information comprises:
   determining, by the terminal, a location information indicating a location of the terminal at the received time information.

8. The method according to claim 1, further comprising:
   receiving, at the terminal, a location request comprising a received confidence level, the received confidence level indicating a desired level of confidence of the location information transmitted by the terminal,
wherein determining the location information and time information comprises:
   determining, by the terminal, a location information and a corresponding time information such that the location information and the time information indicate the location of the terminal at time indicated by the corresponding time information with the desired level of confidence.

9. The method according to claim 1, further comprising at least one of:
   determining a current location information of the terminal,
   determining a current speed information of the terminal,
   determining a current direction information of the terminal, and
   determining a current environmental information of the terminal,
wherein determining the location information comprises:
   determining the location information based on at least one of the current location information, the current speed information, the current direction information, and the current environmental information.

10. A terminal for a communication network, the terminal comprising:
   a positioning unit configured to determine a location information indicating a location of the terminal in the communication network,
   a processing unit configured to determine a time information indicating a time at which the terminal is located at the location indicated by the location information, and
   a transceiver unit configured to transmit the location information and the time information to a base station or another terminal of the communication network, wherein the transceiver unit is configured to communicate data of a data communication between the terminal and the base station or the other terminal of the communication network, the data communication being configured at the base station or the other terminal depending on the location information and the time information received from the terminal.

11. The terminal according to claim 10, wherein the terminal comprises at least one device of a group of devices comprising a mobile telephone, a tablet computer, a mobile computer, a smart mobile accessory, a smart wearable device, a vehicle-to-vehicle communication device and a vehicle-to-infrastructure communication device.

12. A method for operating a node of a communication network, the method comprising:
   receiving, at the node, a location information and a time information from a terminal of the communication network, the location information indicating a location of the terminal in the communication network and the time information indicating a time at which the terminal is located at the location indicated by the location information,
   configuring a data communication between the node and the terminal depending on the location information and the time information received from the terminal.

13. The method according to claim 12, wherein the node comprises at least one of a base station, a relay node and another terminal.

14. The method according to claim 12, wherein the location is a future location of the terminal and the time is a future time at which the terminal will presumably be located at the future location.

15. The method according to claim 14, wherein receiving the location information and the time information comprises receiving a confidence level information indicating a level of confidence of a prediction that the terminal will be located at the future location at the future time.

16. The method according to claim 12, wherein the time information comprises a period of time at which the terminal is located at the location indicated by the location information.

17. The method according to claim 12, wherein the location information comprises at least one of:
   a predicted future geographical location and a predicted future geographical location deviation,
   a current geographical location,
   a current speed information, and
   a current direction of movement information.

18. The method according to claim 12, further comprising:
   transmitting, from the node to the terminal, a request to transmit a capability information indicating a capability of the terminal to predict a future location of the terminal, receiving, at the node from the terminal, the capability information.

19. The method according to claim 12, further comprising:

transmitting, from the node to the terminal, a location request comprising a time information, the time information indicating a future point in time or a future time period for which the node requests a location information from the terminal.

20. The method according to claim 12, further comprising:

transmitting, from the node to the terminal, a location request comprising a confidence level, the confidence level indicating a desired level of confidence of the location information transmitted from the terminal.

21. A node for a communication network, the node comprising:

a transceiver unit configured to receive a location information and a time information from a terminal of the communication network, the location information indicating a location of the terminal in the communication network and the time information indicating a time at which the terminal is located at the location indicated by the location information, and a processing unit configured to configure a data communication between the node and the terminal depending on the location information and the time information received from the terminal.

\* \* \* \* \*